(No Model.)
W. F. WAGNER.
ROLLER BEARING FOR CARRIAGE SPINDLES.
No. 544,451. Patented Aug. 13, 1895.
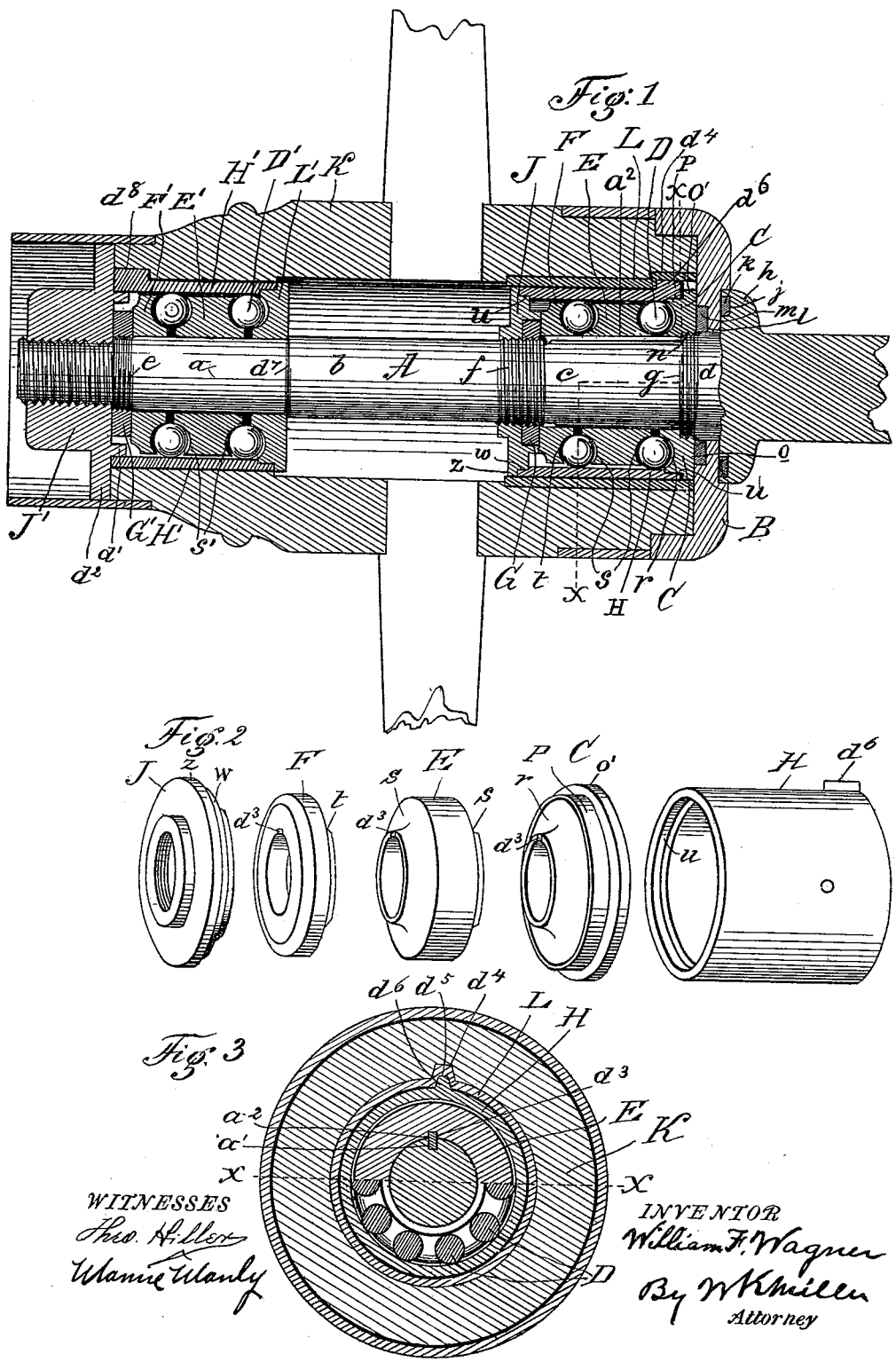

UNITED STATES PATENT OFFICE.

WILLIAM F. WAGNER, OF MASSILLON, OHIO.

ROLLER-BEARING FOR CARRIAGE-SPINDLES.

SPECIFICATION forming part of Letters Patent No. 544,451, dated August 13, 1895.

Application filed March 2, 1895. Serial No. 540,383. (No model.)

*To all whom it may concern:*

Be it known that I, WILLIAM F. WAGNER, a citizen of the United States, and a resident of Massillon, county of Stark, State of Ohio, have invented a new and useful Improvement in Roller-Bearings for Carriage-Spindles, of which the following is a full, clear, and exact description, reference being had to the accompanying drawings, making part of this specification.

My invention relates to improvements in carriage-spindles; and it consists of certain features of construction and combination of parts, as will be hereinafter described, and pointed out in the claims.

Figure 1 of the accompanying drawings is a view, partly in section and partly in perspective, showing parts in operative position. Fig. 2 is a perspective of several parts of detail which will be lettered and described hereinafter, and Fig. 3 is a cross-section on line $x\,x$ of Fig. 1.

A denotes the spindle, which is formed substantially as shown, having different diameters, as $a\,b\,c\,d$, and annular screw-threads $e$, $f$, and $g$ and collar $h$. On the inner face of the collar $h$ is provided a recess $j$, in which is placed a packing-ring $k$. On the large portion $d$ of the spindle A is placed a so-called "sand-band" B, having in its inner face a recess $l$, in which is placed a packing-ring $m$. The outer edge of the sand-band is flanged over the inner end of the hub K, as shown in Fig. 1.

The object of the described sand-band and packing-rings is to provide against the escape of oil that may have been applied to the inclosed parts and to prevent sand or dust passing therein.

C denotes a collar having an annular thread $n$, adapted to the thread $g$ on the spindle, an inside face $o$, adapted to rest against the packing-ring $m$, and an outwardly-projected flange portion $o'$ and a shoulder P. At the outer face of the collar is provided a circular recess $r$, adapted to the diameter of the antifriction-balls D. A collar portion, as E, is provided having similar recesses $s$ at each side, as shown in Fig. 1, which in connection with the recess $r$ in collar C form a circular groove about the spindle A to retain the balls D, and to form a second groove a collar F is provided having in its inner face a circular recess $t$, which in connection with the recess $s$ serves to form a second annular groove about the spindle A for the purpose of securing a second series of antifriction-balls. To secure the collars E and F in desired adjustment with reference to the outside diametrical line described by a series of balls, a nut G is placed on the spindle and turned on the threaded portion $f$, and by means of said nut the collars E and F may be adjusted to regulate the said balls in position, as hereinafter stated. A hardened-steel sleeve H, having internal recesses $u$ at its extremities, is passed over the balls D and the recessed collars and so placed that the inward end of said sleeve rests on a shoulder P of the collar C and sets against the flange $o'$. The nut G may then be turned to bear against the collar F, pressing it to the collar E and the latter to the collar C, and the annular recesses in said collars are so formed that such pressure by the nut G forces the balls D outward against the inner surface of the sleeve H. To support the opposite end of the sleeve H a threaded collar J is placed on the spindle and may be turned on the threaded portion $f$ to and against the nut G. At its inner edge the collar J is recessed, as seen at $w$, to receive the end of the sleeve H and its longitudinal movement is prevented by the flange $z$.

To hold the collars C, E, and F from rotation on or about the spindle a groove $a'$, as shown in Fig. 3, is provided, in which is placed a spline $a^2$. Corresponding grooves $d^3$ are provided in the collars that pass over the spline, and to secure a coincident rotation of the sleeve H and the hub K a metal box L is placed in the large end of the hub, which has a wing $d^4$ seated in the hub. The inside face of the wing is provided with a groove $d^5$ to receive a wing $d^6$ on the sleeve H, as shown in Fig. 3.

On the outward portion of the spindle A is a shoulder $d^7$, against which is placed a collar L', which is recessed like the collar C, and two other collars E' and F', which are similar in construction to the collars E and F, are placed on the spindle, the three collars L', E', and F' being arranged to form annular grooves, in which are placed the balls D' in like manner with the ball-bearing collars first described. A sleeve H' is placed over the balls D' and is provided at its outer end with a wing $d^8$, which is seated in the hub. A nut G' is placed on a threaded portion $e$ of the spindle, and the collars, with balls D', may be adjusted by means of said nut, and a threaded collar J', provided with supporting-shoulders $d'$ and a flange $d^2$, is placed on the extremity of the spindle and serves to support one end of the sleeve H' and to secure the hub on the spindle.

The sleeve H' at the outer end of the hub has a wing $d^8$, which extends into a recess in the hub, said sleeve being in position the reverse of that of the sleeve H.

To adjust the balls to the inner surface of the sleeve the nuts G are turned on or off, as the case may be, whereby an accurate adjustment may be had of the parts, as well as to provide against wear.

When it is desired to adjust the collars C, E, and F, the nuts J' and G' on the outer end of the spindle, the sleeve H', and collars L', E', and F' may be removed, and by means of a suitable implement the nut J may then be withdrawn and the nut G may then be turned so as to move against or from the adjacent collar F.

It will be noticed that the circular form of the groove provided as a track for the balls is of such form as to reach out and over the center of the balls, whereby they are held in position in the groove, though the sleeve H be removed, thus affording an opportunity to wash out or oil the parts without displacing or loosening the balls.

Having thus fully described the nature and object of my invention, what I claim is—

1. The combination with a hub and a spindle, of a series of movable collars having annular recesses therein which are semicircular in cross section to form annular grooves about the spindle, series of anti-friction balls placed loosely in said grooves, a sleeve inclosing said collars and balls, a metal box provided with a wing for connection with said hub, said sleeve being adapted to connect with said box, and devices for the adjustment of said movable collars, whereby said balls may be adjusted to said sleeve, substantially as and for the purposes described.

2. The combination with a spindle, A, of a collar, L', having a semicircular, annular recess, movable collars, E' and F', having annular recesses corresponding with the recess in collar, L', and forming annular grooves about said spindle, balls placed loosely in said grooves, a sleeve, H', inclosing said collars and balls, a nut, G', on said spindle, adapted for the adjustment of said collars, and a retaining nut, J', having an inward projection, $d'$, to support the outer end of said sleeve, and a flange, $d^2$, to secure said sleeve from longitudinal movement, substantially as and for the purposes described.

3. The combination with a spindle and a hub, of the adjustable collars, having retaining grooves, balls in said grooves, the sleeve, H, having a wing, $d^6$, and the box, L, provided with a grooved wing to receive the wing, $d^6$, substantially as set forth and described.

In testimony whereof I have hereunto set my hand this 13th day of February, A. D. 1895.

WILLIAM F. WAGNER.

Witnesses:
W. K. MILLER,
CHAS. R. MILLER.